(12) United States Patent
Nawrocki

(10) Patent No.: US 9,691,013 B2
(45) Date of Patent: Jun. 27, 2017

(54) ELECTRONIC CIRCUIT OF A MICROPROCESSOR PROXIMITY DOCUMENT AND A PROXIMITY DOCUMENT

(71) Applicant: Piotr Nawrocki, Inowroclaw (PL)

(72) Inventor: Piotr Nawrocki, Inowroclaw (PL)

( * ) Notice: Subject to any disclaimer, the term of this patent is extended or adjusted under 35 U.S.C. 154(b) by 0 days.

(21) Appl. No.: 14/571,226

(22) Filed: Dec. 15, 2014

(65) Prior Publication Data

US 2016/0171362 A1    Jun. 16, 2016

(51) Int. Cl.
*G06K 19/06* (2006.01)
*G06K 19/077* (2006.01)
*G06K 19/07* (2006.01)

(52) U.S. Cl.
CPC ... *G06K 19/07701* (2013.01); *G06K 19/0723* (2013.01); *G06K 19/07754* (2013.01)

(58) Field of Classification Search
CPC .............. G06K 19/07749; G06K 19/0775
USPC ................................. 235/487, 492
See application file for complete search history.

(56) References Cited

U.S. PATENT DOCUMENTS

| | | | |
|---|---|---|---|
| 9,033,250 B2* | 5/2015 | Finn | G06K 19/07769 235/492 |
| 2015/0021403 A1* | 1/2015 | Finn | G06K 19/07747 235/492 |
| 2015/0269477 A1* | 9/2015 | Finn | G06K 19/07794 235/492 |

* cited by examiner

*Primary Examiner* — Daniel St Cyr

(74) *Attorney, Agent, or Firm* — Masuvalley & Partners

(57) ABSTRACT

The present invention is an electronic circuit of a microprocessor of a proximity document, including the microprocessor, the transceiver antenna and the touch switch, characterized in that the switch includes an active graphene element, where the switch contacts are led to the surface of the document and so are electrically connected to the microprocessor and the antenna that touches them closes the circuit and allows communication between the microprocessor and the antenna, while in the opposite case the circuit is opened, and the communication between the microprocessor and the antenna is not possible. The invention further includes the proximity document containing such an electronic circuit.

8 Claims, 4 Drawing Sheets

Fig. 7A
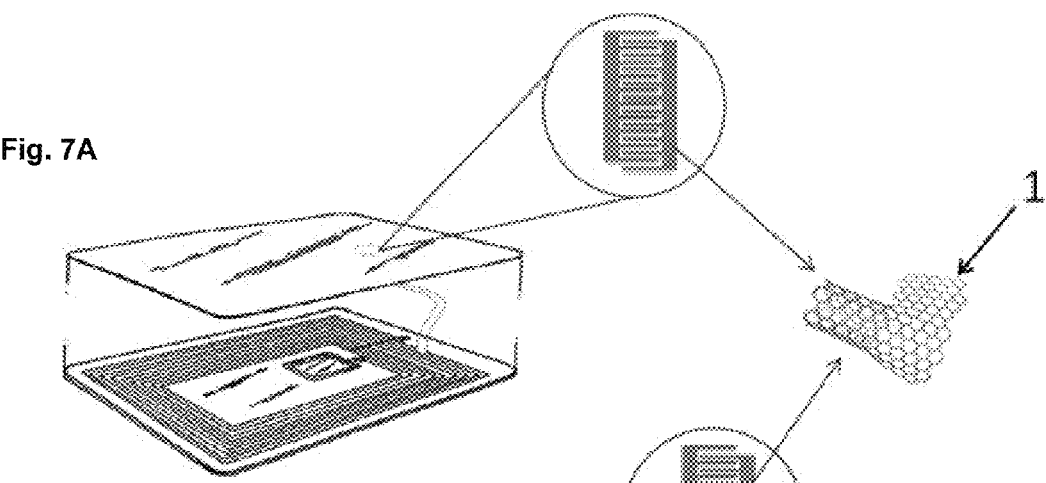
Fig. 7B
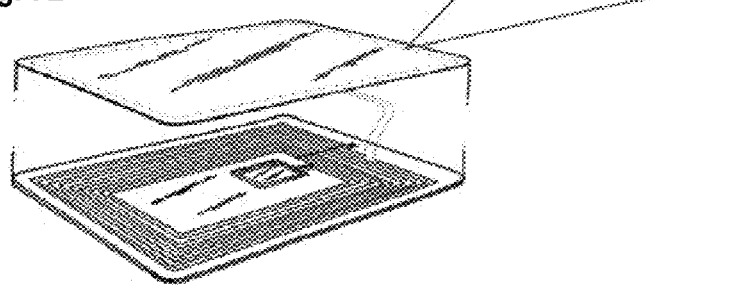
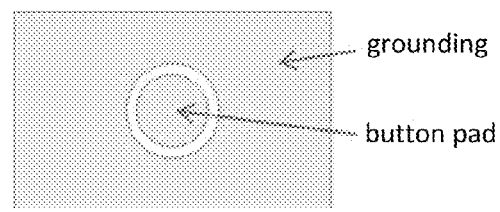
Fig. 8
(prior art)

ELECTRONIC CIRCUIT OF A MICROPROCESSOR PROXIMITY DOCUMENT AND A PROXIMITY DOCUMENT

RELATED APPLICATIONS

The present invention claims priority to European Patent Application No. EP14460117.6 filed Dec. 10, 2014 entitled Obwód elektroniczny mikroprocesorowego dokumentu zbliżeniowego oraz dokument zbliżeniowy, which is incorporated herein by reference in its entirety.

FIELD OF THE INVENTION

The present invention is an electronic circuit of a microprocessor proximity document with a microprocessor, a transceiver antenna and a touch switch based on graphene.

A graphene layer is part of the touch switch, built-in the electronic circuit of the proximity document.

The solution can be used in different types of proximity documents.

BRIEF DESCRIPTION OF THE DRAWINGS

The invention will now be further described in the preferred embodiments, with reference to the accompanying drawings, in which:

FIG. 2B) a layer of graphene (two-dimensional or 3D structure e.g. nanotubes) is "embedded" on the surface of a single layer of polymer;

FIG. 2C) a doped layer of graphene (two-dimensional or 3D structure e.g. nanotubes) exists between the two polymer layers with contact leads to the surface of one of the two polymer layers; or FIG. 2D) a doped layer of graphene (two-dimensional or 3D structure e.g. Nanotubes) is "embedded" on the surface of a single layer of polymer.

FIG. 3B) the arrow shows the direction of signal transmission from microprocessor of the proximity document by proximity document antenna that transmits the signal to the reader antenna.

FIG. A) proximity arrangement is illustrated schematically in an inactive state, FIG. B) proximity arrangement is illustrated schematically when a finger presses the touch switch in appropriate proximity of the reader.

Figure 5:
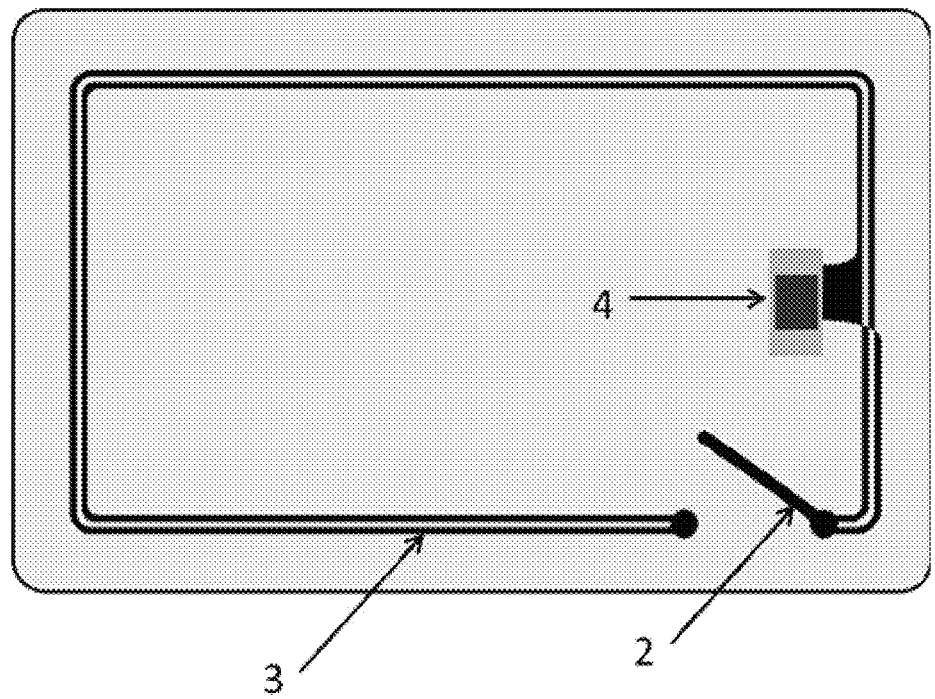

FIG. 5 illustrates an electronic microprocessor circuit diagram of a proximity document that shows the microprocessor, the antenna and the switch.

Figure 6:
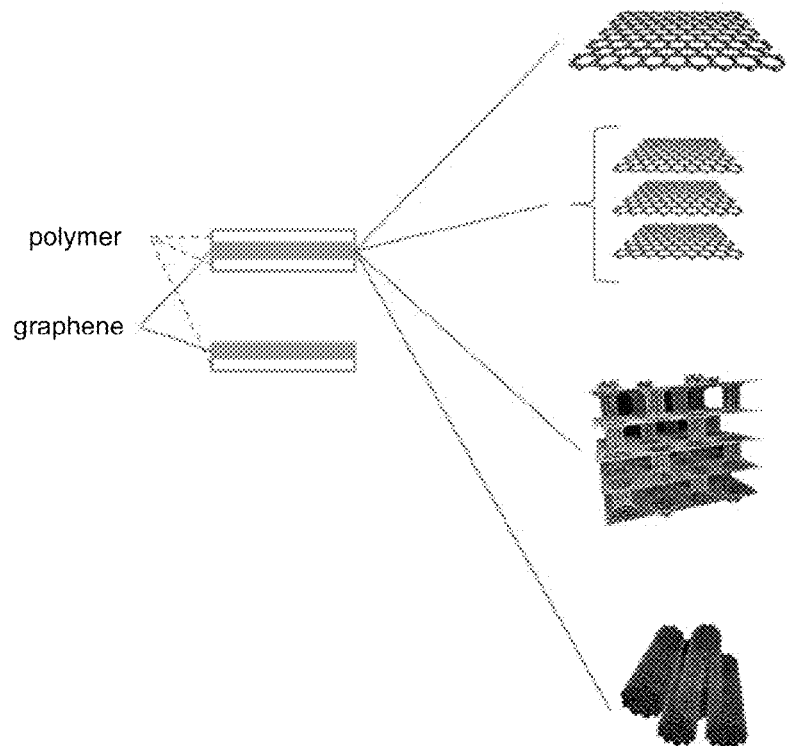

FIG. 6 illustrates examples of the arrangement of layers in the component comprising an elastic graphene nanocomposite layer, according to the present invention.

FIGS. 7A-7B illustrate the switch embodiments in accordance with the invention in a proximity document in a form of a card:

FIG. 7A) a point switch—with contact fitted in a part of the surface of the document;

FIG. 7B) a whole-surface switch—with a contact fitted through the entire surface of the document.

FIG. 8 (prior art) is a schematic diagram of a capacitor, which is an example of a capacitive touch system.

Moreover, the figures use the following indications: 1—elastic layer of a nanocomposite material; 2—a switch; 3—an antenna; 4—a microprocessor, and in FIGS. 2A-2D P is a polymer, G—graphene and PG—doped graphene.

DETAILED DESCRIPTION OF THE PREFERRED EMBODIMENTS

Reading information from cards is done wirelessly by electromagnetic induction without the need for inserting the card into the readers inductor of the reader induces the card inductor, which powers the electronic circuit of the card. This circuit modulates accordingly the signal generated by the card coil, which is received by the reader and the interpreted accordingly. Standard cards operate at a distance of a few to several centimeters. There are cards with their own power supply, which allows to increase the range up to a few meters. Thanks to wireless communication, the card is easy to use (no need to move the card through the reader), but also more durable than magnetic or smart cards, which are subject to mechanical wear. The construction of a proximity card is controlled by the family of standards ISO/IEC 14443. Also ISO 15693 is a related standard. The most common industry standard used to support contactless cards is Mifare standard introduced by Philips.

Proximity systems are used mainly as:
transport ticket means, so-called city cards;
electronic student cards;
electronic library cards, parking cards, etc.;
electronic wallets (e.g. to pay city parking fees);
ID tags and passes (e.g. for employees in large companies, fans in stadiums);
electronic signature media;
elements of safety systems (alarms, security entrance doors, gates, locks);
as an integral part of the proximity system of passports;

The specificity and capacity of proximity documents enables them to fulfill several of these tasks. RFID technology (Radio-Frequency Identification) uses radio waves to transmit data and power the electronics (RFID tag) constituting the object tag by the reader to identify the object. The technology allows reading and writing of the RFID system. Depending on the design it allows you to read the labels from a distance of a few centimeters or a few meters from the reader antenna. The reading system allows simultaneous identification of multiple tags contained together within the reading field. Sometimes the RFID technology is referred to as a radio barcode. And just as for the barcodes to spread globally, a worldwide unification action was needed, as well as for RFID technology that kind of unification is needed. RFID attached to an object can be a form of protection against forgery.

In its basic configuration, the system comprises a reader system comprising a transmitter, a receiver and a decoder, a transceiver antenna or two antennas: transmitting and receiving, a label system called transponders or tags consisting of an electronic circuit, which is an integrated circuit without casing, and an antenna. The reader via an antenna of the transmitter produces an alternating electromagnetic wave, the same or the other antenna receives electromagnetic waves, which are then filtered and decoded so as to read the tag response. Passive tags do not have their own power supply, when they are in the electromagnetic field of the resonance frequency of the reception circuit accumulate the received energy in the capacitor included in the structure of the tag. After receiving enough energy, a reply that contains the tag code is sent. In most applications transmitting the charging wave and informing about finding the system in the field of the reader is interrupted and transponders respond in times of interruption of transmission. The transponder does not respond immediately, but after a while, and if it replied and remains in the field of an electromagnetic wave, it remains inactive for a specified time, which allows you to read many transponders simultaneously in the reading field. 125 kHz frequency is used most commonly, allowing you to read from a distance of no more than 0.5 m, but more complex systems, allowing, for example, reading and writing information, run at a frequency of 13.56 MHz and provide a range from a meter to a few meters. Other useful frequencies-868 . . . 956 MHz, 2.4 GHz, 5.8 GHz-provide coverage up to 3 and even 6 m.

There are known ways to start and block the data transmitted in the contactless documents generally known as RFID identifiers, but this is only due to the use of appropriate protocols and cryptographic algorithms for the exchange of information between the reader and the document equipped with a contactless microprocessor chip.

An example of such applications are patents for VISA USA—Patents No.: U.S. Pat. No. 7,482,925 B2, U.S. Pat. No. 7,522,905 B2, U.S. Pat. No. 7,740,168 B2 and U.S. patent application Ser. No. U.S. 2005/0038718 A1 to American Express Travel Related Services Company Inc.

In these applications the use of appropriate protocol allows communication between any reader connected to the system and a contactless document. This solution allows you to communicate and make necessary operations, such as credit card payments, identifying a person in case of an identity document or use of contactless cards as an electronic key.

Radio exchange of information poses a risk of unauthorized use of them at a distance without direct access or knowledge of the owner.

The examples are not similar to the present invention, and only the final result of data exchange is similar. It is possible to provide a solution close to the object of the present invention in the prior art, because so far none has not been made.

The essential flaw, which was also described in the aforementioned patents VISA USA, is the possibility of excitation of the document by unauthorized readers using the same protocols and algorithms, resulting in the possibility of cloning or unauthorized use of the data contained in contactless documents. The effect of this can be using the identity of the owner of the document, unauthorized charging cards, or using copies of unauthorized electronic keys to enter the premises using such a system.

Another drawback of the above methods is the possibility of unauthorized tracking of a document also described in the aforementioned application by American Express Travel Related Services Company Inc. Tracking can include unauthorized control of the owner of the document for later use of information about his whereabouts or preferences. This can be done through a network of receivers installed in shops and other places, such as schools, shopping centers, bus stops and other public places. Such a system allows the identification of a person, tracking his movement and constant monitoring of his behavior.

RFID tags are controversial in relation to security and privacy. The technique of remote reading of identification data can lead to undesirable effects. At Eurocrypt 2009 conference in Cologne the report published was which shows that it is possible to copy the data remotely from an unknown card type of standard ISO/IEC 14443, ISO 15693 or Mifare in a very short period of time (from a few seconds to a minute), without the knowledge of any signals by the reader. This problem in varying degrees affects all cards of this type and is due to the gaps in the mechanism of encryption and pseudorandom number generator. Since that time, there were several presentations of decoding and cloning of documents containing contactless chips.

In the literature (US 2008/0061148 A1, US 2009/0272815 A1, US 2008/0035740 A1) RFID tags are known which also have switches that trigger the transmission of data only when they are pressed with a finger. By contrast, blocking data transmission occurs immediately after removing a finger from the switch.

According to the above-mentioned solutions publications pressure sensors were used as switches (pressure sensing device), switches with mechanical contacts, membrane switches or possibly containing "quantum tunneling composite" (QTC).

The present invention proposes an alternate solution.

Electronic card security solution according to the invention is designed especially for the documents in the form of cards, containing information and used for identification of the recipients, e.g. credit cards, proximity cards, input cards, identification documents, and documents that use wireless communication between the document and the reader. The invention is particularly applicable wherever the data content placed on the identification document would cause easy data acquisition due to illegal takeover of data from a document containing a contactless chip.

Haptics

There are three types of haptics:
capacitive
resistive
piezoelectric
Capacitive touch systems, although they have been known to engineers for years, have only recently become a viable alternative to mechanical switches used in consumer electronics. The main reason was the progress in the technology of programmable integrated circuits combining in one piece analog and digital circuits.

Typical capacitive touch systems can be switched by a finger approaching them at a distance of less than 3 mm. For larger distances, for example when it is desirable for a switch to be placed behind thick glass, the detection of the actual approximation of the finger becomes problematic.

The operation of the capacitive circuits is based on the phenomenon of the impact of the electric field with conductors, in particular the human body, which is filled with electrolytes and surrounded by a conductive layer of lossy dielectric—the skin. The electronic component that produces the electric field is obviously a capacitor and as with any capacitor each part of the field goes out the covers. This field is called the boundary field. The system of covers in the touch switch is designed so that the field is the greatest and directed to the area available to the user's finger. It can be seen that the capacitor with parallel covers is not a good structure in this case, because boundary field in it is minimal.

The finger located in the boundary electric field introduces a certain capacity into the chip, which is called touch capacitance (CD). The capacity of the switch without the presence of a finger in a field boundary is defined as proper capacitance (CP). The widespread belief that for the correct operation of capacitive circuits the finger must be grounded, is wrong. The presence of the finger is detected by the boundary field, as it can store charge, and this fact does not affect its possible grounding.

One embodiment of a capacitive touch system is a capacitor shown in FIG. 8 (prior art).

The diameter of the pillow switch for this example is 10 mm, which is the average size of an adult human fingertip. The grounding is also on the top side of the plate, whereby the pad-grounding system can be regarded as a capacitor in which a large part of the energy is stored on the surface of the plate. The pad is isolated from the mass with a ring-shaped gap, the width of the gap is an important design parameter. If it is too small, most of the energy of the electric field "escapes" directly to the mass. However, if it is too large, it becomes impossible to control the marginal distribution of the electric field.

For proper operation of the system also an appropriate choice of the current of the current source and operating frequency of the generator is necessary. By default, the current source is about 14 pA, and capacitance measurement time for a single switch is 500 ms. From the analysis of the counts plate and differential switch plate it can be concluded that each switch has its proper capacity (CP) of about 15 pF and tactile capacity (CF) of about 0.5 pF. Therefore, pressing the system alters the total capacity of the system by about 3%.

The main advantage of the capacitive touch systems over their mechanical counterparts is that they do not wear out during the operation. However, only the progress in recent years in the field of signal processing has greatly reduced the costs and increase their sensitivity and reliability.

Resistance haptics require two electrodes, which require contact (short circuit) with a conductive element (e.g. by touching a finger). They work by reducing the resistance between the electrodes. Such systems are much simpler to build in comparison to capacitive systems. Putting, for example, one or two fingers on the plates to achieve the status of a circuit switched on or closed. And moving away the finger (fingers) switches the device off.

Piezoelectric touch system works on the principle of mechanical impact on the piezoceramic elements, usually built directly behind the surface. This solution allows for the construction of tactile interfaces of each type of material. Current solutions allow the construction of such systems in such a way as touching with a force of 1.5 N is sufficient even for rigid materials such as stainless steel.

All the above cited publications disclose the microprocessor circuitry of the proximity document comprising one or more switches, which switches do not contain the graphene layer.

Therefore, the aim of the present invention to provide a novel touch switch, which includes a graphene-polymer layer based on flexible graphene nanocomposite, allowing you to enhance the safety of the use of microprocessor-based contactless documents, by triggering data transmission using a human finger.

According to the present invention, the electronic circuit of the microprocessor proximity document, comprising a microprocessor, a transceiver antenna, and a touch switch characterized in that said switch comprises an active graphene element, wherein the switch contacts are brought out to the surface of the document, and so electrically connected to the microprocessors and the antenna that touching them closes the circuit and allows communication between the microprocessor and the antenna, while in the opposite case the circuit is opened, and the communication between the microprocessor and the antenna is impossible.

Preferably, the active graphene element comprises at least one graphene layer disposed on a polymer layer.

Preferably, the switch contacts are brought out to some or all of the surface of the proximity document;

Preferably, the switch in it is between the microprocessor and the antenna.

Preferably graphene layer is in a two-dimensional form having a thickness of one atom or more than one atom or three dimensional and preferably they are nanotubes arranged in different directions, in particular parallel or perpendicular to the surface of the polymer.

Preferably, the graphene in the graphene layer in its pure or doped form.

Preferably, the touch switch comprises two polymer layers between which a layer of graphene is arranged.

Preferably, said polymer layer is a polymer selected from the group consisting of polyethylene terephthalate (PET), polyethylene naphthalate (TEN), polyethersulfone (PES), and polycarbonate (PC), polypropylene (PP), poly(ethylene oxide) (PEO), poly(vinyl chloride) (PVC), synthetic rubber, most preferably polyethersulfone (PES), polycarbonate (PC);

The invention further includes the proximity document containing an electronic circuit.

Preferably, it is a credit card, a cover of a biometric passport, a driving license, an ID card, vehicle transport tickets, an electronic student card, an electronic library card, a parking card, an electronic purse, an ID tag and a pass, a carrier of an electronic signature, a safety systems component especially alarms, entrance doors, gates and locks security.

Example 1—Electronic Circuit of a Microprocessor Proximity Document

Figure 1:
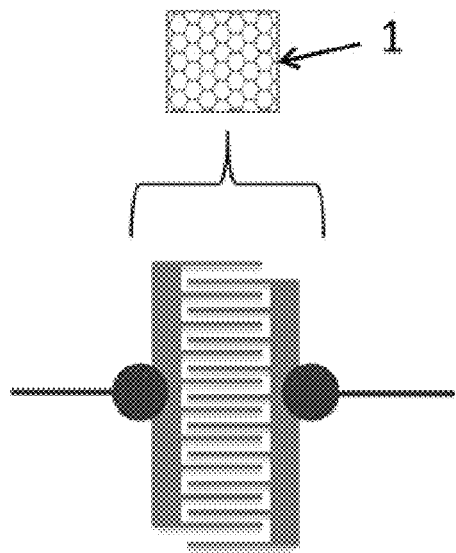
FIG. 1 schematically illustrates a touch switch having an elastic graphene nanocomposite layer as an active graphene element according to the present invention.
Figure 2A:
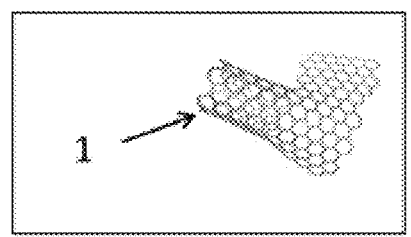
FIGS. 2A-2D illustrate types of flexible nanocomposite layer of the switch in accordance with the present invention, wherein FIG. 2A) a layer of graphene (two-dimensional or 3D structure e.g. nanotubes) exists between the two polymer layers with contact leads to the surface of one of the two polymer layers.
Figure 2A:
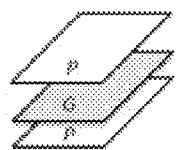
Figure 2B:
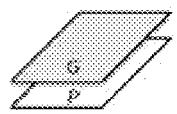
Figure 2C:
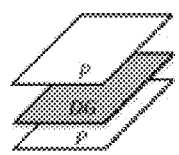
Figure 2D:

According to the present invention, the main element of the electronic microprocessor circuit of the proximity document is a flexible nanocomposite material layer as the active graphene element 1 (FIG. 1).

Presented protection is a separate solution, not interfering with any other group of securities known in the art, maybe present in the proximity document.

The circuit does not require a constant power source.

The protection circuit according to the technological modification is not limited by current system, shape and size.

Flexible nanocomposite material 1 (FIG. 2)—is a heterogeneous material structure composed of two or more components with different properties. The properties of the composites are not the sum or average of the properties of its components, and the material used in its construction exhibits anisotropy of physical properties.

One of the components is adhesive, in this case, any polymer P selected from the group consisting of polyethylene terephthalate (PET), polyethylene naphthalate (TEN), polyethersulfone (PES), and polycarbonate (PC), polypropylene (PP), poly(ethylene oxide) (PEO), poly(vinyl chloride) (PVC), synthetic rubber, preferably polyethersulfone (PES), polycarbonate (PC), that ensure its consistency, hardness, flexibility and resistance to compression, and the second is a monatomic layer of graphene, which provides properties while maintaining transparency of the conductive material.

Graphene G has all the properties corresponding to the requirements of the production of nanocomposite material for a touch switch in a proximity document, including:
- very good heat and electricity conductivity
- low resistivity
- high transparency
- properties of a semiconductor The structure of the nanocomposite material of the touch switch in the proximity document of the invention takes into account:
- using more layers of graphene in the material—the number of mononuclear layers depends on the conditions under which the proximity document will operate.
- the use of graphene in the form of nanotubes, if the use of the properties of graphene, which is given by such construction are necessary to increase the effectiveness of the electronic circuit.
- doping of graphene to modify some properties of the material, e.g.: optical, electrical, magnetic or mechanical.

The properties of graphene fully meet the requirements for the creation of a nanocomposite material, which is an essential element of an electronic microprocessor circuit of a proximity document. However, one should not be limited to graphene only, if similar conditions are produced using other nanostructures.

According to the invention, the components of the nanocomposite layer of the touch switch of a proximity document should be made in one of the selected ways:
a) a layer of graphene (two-dimensional or of a structure e.g. nanotubes) between the two polymer layers with contact leads to the surface of one of the two polymer layers;
b) a layer of graphene (two-dimensional or 3D structure e.g. nanotubes)"embedded" on the surface of a single layer of polymer;
c) a doped layer of graphene (two-dimensional or of a structure e.g. nanotubes) exists between the two polymer layers with contact leads to the surface of one of the two polymer layers; or
d) a doped layer of graphene (two-dimensional or of a structure e.g. nanotubes) "embedded" on the surface of a single layer of polymer.

At the outset of the design of graphene production process, the polymer which forms the substrate is to be considered. Depending on this, fixing graphene will occur at a variety of processes, for example by changing the physical state of the polymer under the influence of external factors such as temperature, solvents or adhesives or gels of linking properties, etc., allowing to join the layer of polymer and graphene into a single structure.

In this way, the resulting circuit is based on the operation of capacitive circuits.

A circuit made with graphene is completely transparent, which allows to use it as the top layer of the product.

The circuit for securing electronic documents includes a layer touch system and layers securing the system, and between the microprocessor chip 4 and the transceiver antenna 3 of the proximity document there is a switch 2 in the form of a point or whole-surface, allowing the closure of the circuit.

The Principle of Operation

The essence of the solution according to the invention is a method of closing and opening the circuit between the microprocessor chip 4 and the microprocessor transceiver antenna 3 in the proximity document enabling control of communication between the document and the microprocessor chip 4 and the reader of proximity documents. With the opening of the circuit unauthorized access when a document is not used by the owner is turned off, and the security of transactions is ensured, eliminating unauthorized use of the proximity document. Thanks to the available production processes, the important feature is the ability to implement the switch 2 on the surface of the document in the form of a point or whole-surface.

Figure 3A:
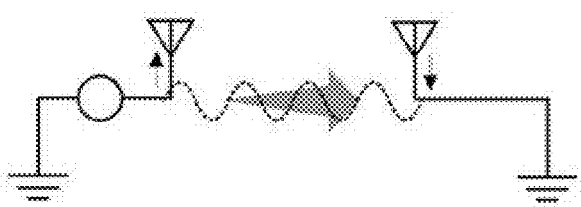
FIGS. 3A-3B (prior art) show a prior art method for communication between a proximity document and a reader, FIG. 3A) the arrow shows the direction of the signal transmission for the reader antenna by the antenna of the proximity document to the microprocessor of the proximity document.
Figure 3B:
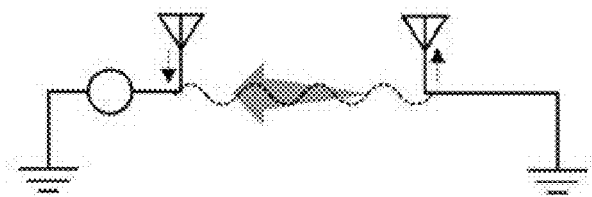

In the standard operation of the card/reader by presenting the document (card) to the reader, the signal is transmitted by reader antenna to the card antenna 3, and the signal induces the microprocessor chip 4 (FIG. 3A), which in turn sends a signal to the reader (FIG. 3B).

Microprocessor electronic circuit of the proximity document starts by touching the switch 2 and the circuit closes, allowing the exchange of signals and data between the reader and the microprocessor 4.

The electronic circuit is made so as to operate capacitively with the circuit closed with a finger.

Figure 4A:
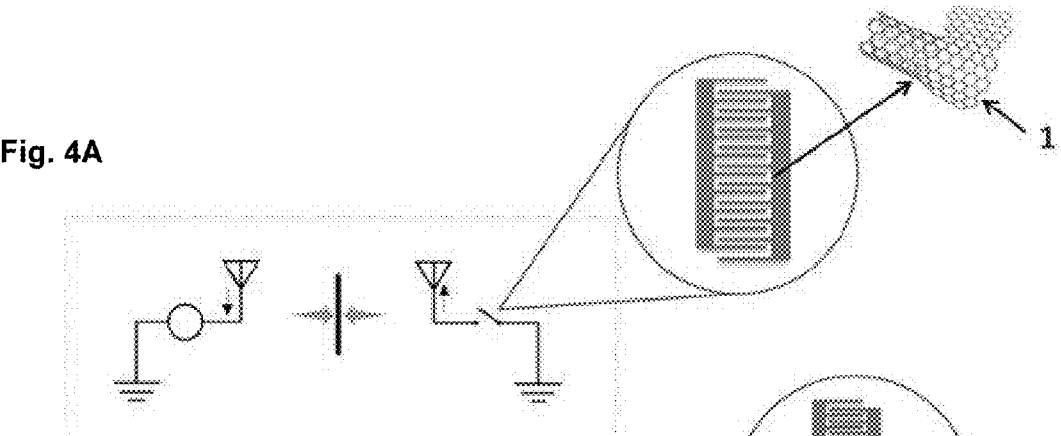
FIGS. 4A-4B illustrate a communication method of a proximity document having a touch switch according to the invention with a flexible nanocomposite layer with a reader using of the capacitive circuit of the switch.
Figure 4B:
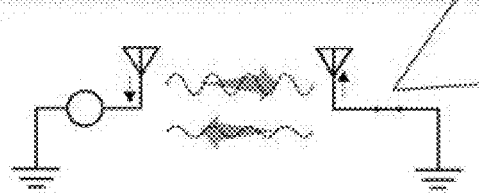

Capacitive mode of operation of the security chip is illustrated in FIGS. 4A-4B.

Protection system diagram is shown in FIG. 5.

Depending on the design, the arrangement of graphene nanocomposite structure can take any form that can achieve maximum performance of the security chip during its use (FIG. 6).

Characteristics:
A touch switch with a composite material is resistant to:
- moisture and condensation
- splashing
- water-damage
- corrosion
- ultraviolet
- dust
- constant magnetic field
- changes in temperature in the range −40° C. to +70° C.
- can be used as a top layer of devices
- runs smoothly even in the case of local surface defects.

Advantages of the present invention are: the ability to control the time of operation with the use of a document, maintaining the proximity nature of the document, even after the invention has been implemented, increasing safety standards in relation to the currently used mechanical blocking access to commit the crime through the unauthorized use or copying of a document.

The circuit of the present invention allows for the safe use of documents using contactless communication technology since the use of the document is only possible at the time of the transaction, which, in the case of payment cards, blocks access for potential criminals.

Example 2—Using the Electronic Circuit of a Microprocessor Proximity Document

The applicability of the electronic circuit is limited only by the invention of the microprocessor-based proximity documents. An example application would be:
- transport ticket means, so-called city cards;
- electronic student cards;
- electronic library cards, parking cards, etc.;
- electronic wallets (e.g. to pay city parking fees);
- ID tags and passes (e.g. for employees in large companies, fans in stadiums);

electronic signature media;

elements of safety systems (alarms, security entrance doors, gates, locks);

The solution according to the invention is shown in an embodiment in which the document is made in the RFID includes an electronic circuit. Regardless of the form of a document (card or booklet) the electronic circuit includes an additional element in the form of a switch whose contacts are led onto the surface of one of the layers in order to provide the user with its functionality (FIG. 7).

Due to the tightness of the access to the production technology of graphene within the next few years documents secured with the invention will have the highest standard of safety.

What is claimed is:

1. An electronic circuit of a microprocessor of a proximity document, comprising:
 a microprocessor;
 a transceiver antenna; and
 a touch switch, where the touch switch comprises an active graphene element, and a switch contact that is led to a surface of the proximity document and so electrically connected to the microprocessor and the antenna so that touching the switch contact closes a circuit and allows communication between the microprocessor and the antenna, while in an opposite case the circuit is opened, and the communication between the microprocessor and the antenna is not possible;
 where the active graphene element comprises a two-dimensional form having a thickness of one atom or more than one atom or three dimensional and preferably the graphene layer comprises a multiplicity of nanotubes arranged in a plurality of different directions, in particular parallel or perpendicular to a surface of a polymer.

2. The electronic circuit of claim 1, where the active graphene element comprises at least one graphene layer disposed on a polymer layer.

3. The electronic circuit of claim 1, where the switch contact is led out to some or all of the surface of the proximity document.

4. The electronic circuit of claim 1, where the switch is located between the microprocessor and the antenna.

5. The electronic circuit of claim 1, where the graphene in the graphene layer is in a pure or a doped form.

6. The electronic circuit of claim 1, where the touch switch comprises at least two layers of a polymer between which the graphene element is arranged.

7. The electronic circuit of claim 1, where the polymer layer is selected from the group of polymers consisting of: a polyethylene terephthalate (PET), a polyethylene naphthalate (TEN), a polyethersulfone (PES), and a polycarbonate (PC), a polypropylene (PP), a poly(ethylene oxide) (PEO), a poly(vinyl chloride) (PVC), a synthetic rubber, a polyethersulfone (PES), and a polycarbonate (PC).

8. The electronic circuit of claim 1, where the electronic circuit is included in a proximity document, where the proximity document is selected from a group consisting of: a credit card, a cover of a biometric passport, a driving license, an ID card, a vehicle transport ticket, an electronic student card, an electronic library card, a parking card, an electronic purse, an ID tag, a pass, a carrier of an electronic signature, a safety system component for an alarm, a door, a gate and a lock.

* * * * *